United States Patent
Zhang et al.

(10) Patent No.: US 10,664,539 B2
(45) Date of Patent: May 26, 2020

(54) TEXT MINING-BASED ATTRIBUTE ANALYSIS METHOD FOR INTERNET MEDIA USERS

(71) Applicant: CHENGDU YUNDUI MOBILE INFORMATION TECHNOLOGY CO., LTD, Chengdu, Sichuan (CN)

(72) Inventors: Guohong Zhang, Sichuan (CN); Xingjun Tan, Sichuan (CN)

(73) Assignee: CHENGDU YUNDUI MOBILE INFORMATION TECHNOLOGY CO., LTD, Chengdu (CN)

( * ) Notice: Subject to any disclaimer, the term of this patent is extended or adjusted under 35 U.S.C. 154(b) by 293 days.

(21) Appl. No.: 15/782,830

(22) Filed: Oct. 12, 2017

(65) Prior Publication Data

US 2018/0032623 A1  Feb. 1, 2018

Related U.S. Application Data

(63) Continuation of application No. PCT/CN2015/090747, filed on Sep. 25, 2015.

(30) Foreign Application Priority Data

Jul. 24, 2015  (CN) .......................... 2015 1 0444180

(51) Int. Cl.
| | |
|---|---|
| G06F 16/215 | (2019.01) |
| G06F 16/9535 | (2019.01) |
| G06F 16/435 | (2019.01) |
| G06K 9/62 | (2006.01) |
| G06Q 50/00 | (2012.01) |
| H04L 29/08 | (2006.01) |

(52) U.S. Cl.
CPC ........ *G06F 16/9535* (2019.01); *G06F 16/215* (2019.01); *G06F 16/435* (2019.01); *G06K 9/6218* (2013.01); *G06Q 50/01* (2013.01); *H04L 67/306* (2013.01); *G06F 2216/03* (2013.01)

(58) Field of Classification Search
CPC ..... G06F 2216/03; G06F 16/215; G06F 17/18
USPC ................................................. 707/692, 776
See application file for complete search history.

(56) References Cited

U.S. PATENT DOCUMENTS

| | | | |
|---|---|---|---|
| 7,577,246 B2 * | 8/2009 | Idan ..................... | H04M 3/5175 379/265.01 |
| 2006/0080296 A1 * | 4/2006 | Morikawa ............. | G06F 16/338 |
| 2014/0075004 A1 * | 3/2014 | Van Dusen ........ | G06Q 30/0201 709/223 |
| 2014/0365525 A1 * | 12/2014 | Pfeifer .................. | G06F 16/367 707/777 |
| 2015/0242589 A1 * | 8/2015 | Neumann .............. | G16H 50/50 703/2 |

* cited by examiner

*Primary Examiner* — Marcin R Filipczyk

(57) ABSTRACT

A text mining-based attribute analysis method for Internet media users comprises a first steps of establishing a label main corpus and a feature corpus sequentially, and updating and maintaining the label main corpus and the feature corpus respectively, and a second step of extracting all history article samples of Internet users, and cleaning out videos, audios and pictures in the samples. The text mining-based attribute analysis method can form attributes of browsed sample articles for each Internet media user, and analyze accurately weights of interesting categories, to identify deeply, analyze, and mine the user attributes, and the basic attributes of the Internet users can also be analyzed.

8 Claims, 4 Drawing Sheets

TEXT MINING-BASED ATTRIBUTE ANALYSIS METHOD FOR INTERNET MEDIA USERS

CROSS REFERENCE TO RELATED APPLICATIONS

The present application is a Continuation Application of PCT Application No. PCT/CN2015/090747 filed on Sep. 25, 2015, which claims the benefit of Chinese Patent Application No. 201510444180.7 filed on Jul. 24, 2015. All the above are hereby incorporated by reference.

FIELD

The subject matter herein generally relates to an attribute analysis method for Internet media users.

BACKGROUND

An article sample mining-based attribute analysis method for Internet media users is used to obtain attributes of the Internet media users, such as customs, demand. The article sample mining-based attribute analysis method for Internet media users is just used to roughly analyze the known attributes.

BRIEF DESCRIPTION OF THE DRAWINGS

Implementations of the present disclosure will now be described, by way of example only, with reference to the attached figures.

DETAILED DESCRIPTION

Figure 1:
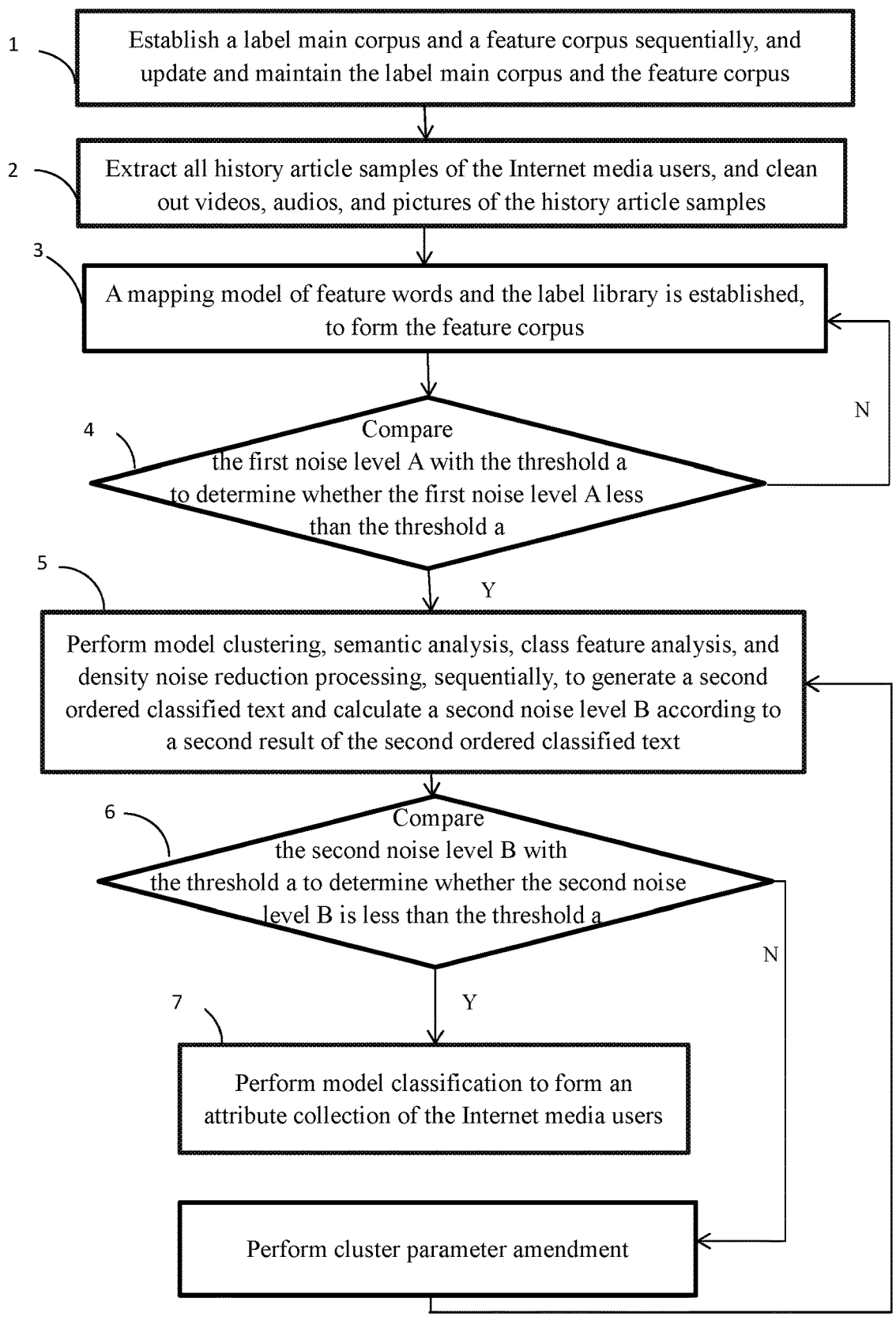
FIG. 1 is a flowchart of one exemplary embodiment of a text mining-based attribute analysis method for Internet media users.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

The present disclosure is described in relation to a text mining-based attribute analysis method for Internet media users to identify, analyze and mine the user attributes of the Internet media users.

FIG. 1 illustrates a flowchart of a method in accordance with an example embodiment. A text mining-based attribute analysis method for Internet media users is provided by way of example, as there are a variety of ways to carry out the method. The illustrated order of blocks is by example only and the order of the blocks can change. Additional blocks may be added or fewer blocks may be utilized without departing from this disclosure. The text mining-based attribute analysis method can begin at block 1.

Figure 2:
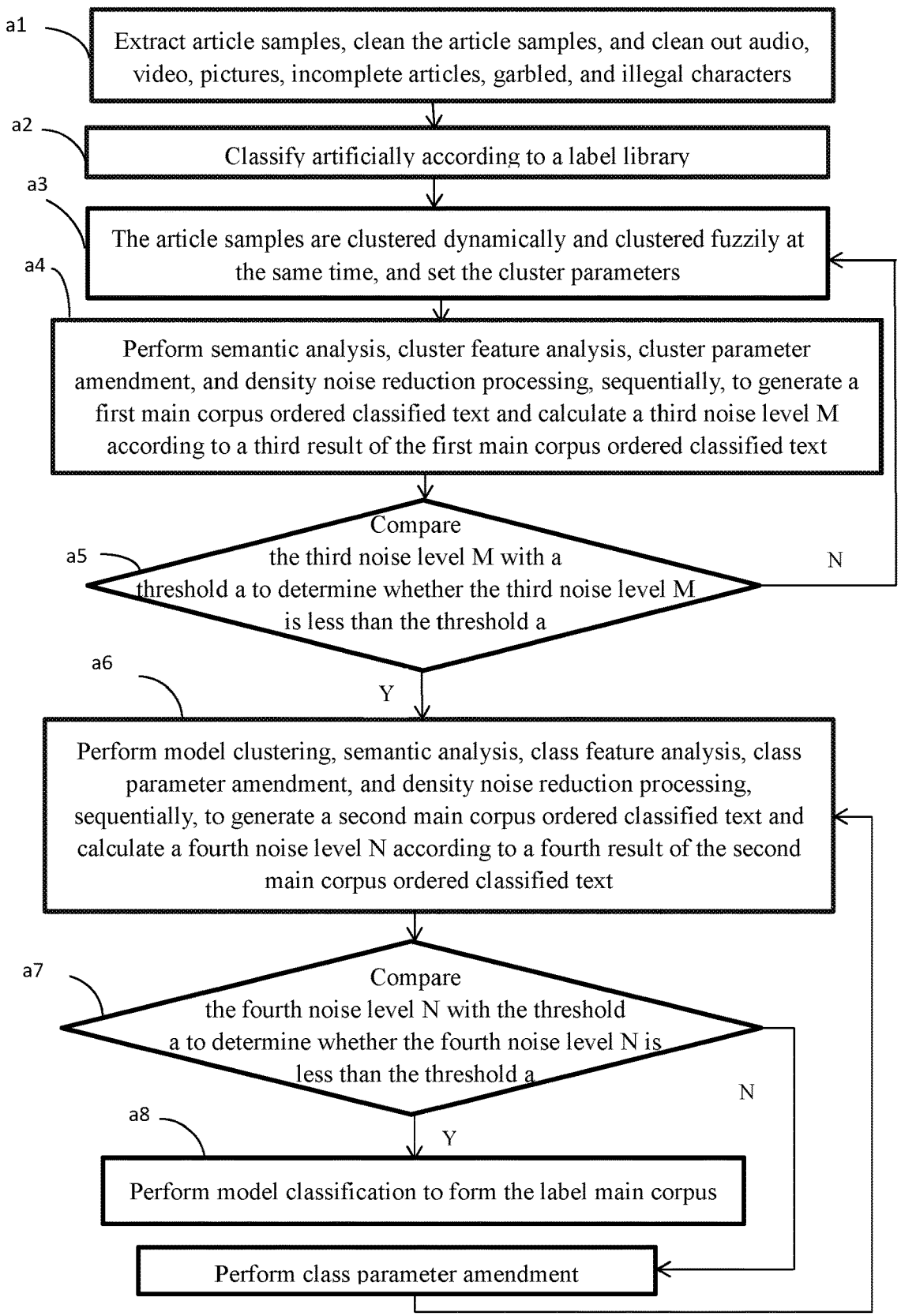
FIG. 2 is a flowchart of one exemplary embodiment of a step of establishing a label main corpus of a block 1 of FIG. 1.

At block 1, establish a label main corpus and a feature corpus sequentially, and update and maintain the label main corpus and the feature corpus respectively. Specifically, FIG. 2 illustrates that the method of establishing the label main corpus. The method of establishing the label main corpus can begin at block a1.

At block a1, extract article samples, clean the article samples, and clean out audio, video, pictures, incomplete articles, garbled, and illegal characters.

At block a2, classify artificially according to a label library.

At block a3, the article samples are clustered dynamically and clustered fuzzily at the same time, and set the cluster parameters.

At block a4, perform semantic analysis, cluster feature analysis, cluster parameter amendment, and density noise reduction processing, sequentially, to generate a first main corpus ordered classified text and calculate a third noise level M according to a third result of the first main corpus ordered classified text.

At block a5, compare the third noise level M with a threshold a to determine whether the third noise level M is less than the threshold a. If yes, the method goes to block a6; if no, the method goes to block a3.

At block a6, perform model clustering, semantic analysis, class feature analysis, class parameter amendment, and density noise reduction processing, sequentially, to generate a second main corpus ordered classified text and calculate a fourth noise level N according to a fourth result of the second main corpus ordered classified text.

At block a7, compare the fourth noise level N with the threshold a to determine whether the fourth noise level N is less than the threshold a. If yes, the method goes to block a8; if no, amend the label library, then the method goes to block a6.

At block a8, perform model classification to form the label main corpus.

Figure 3:
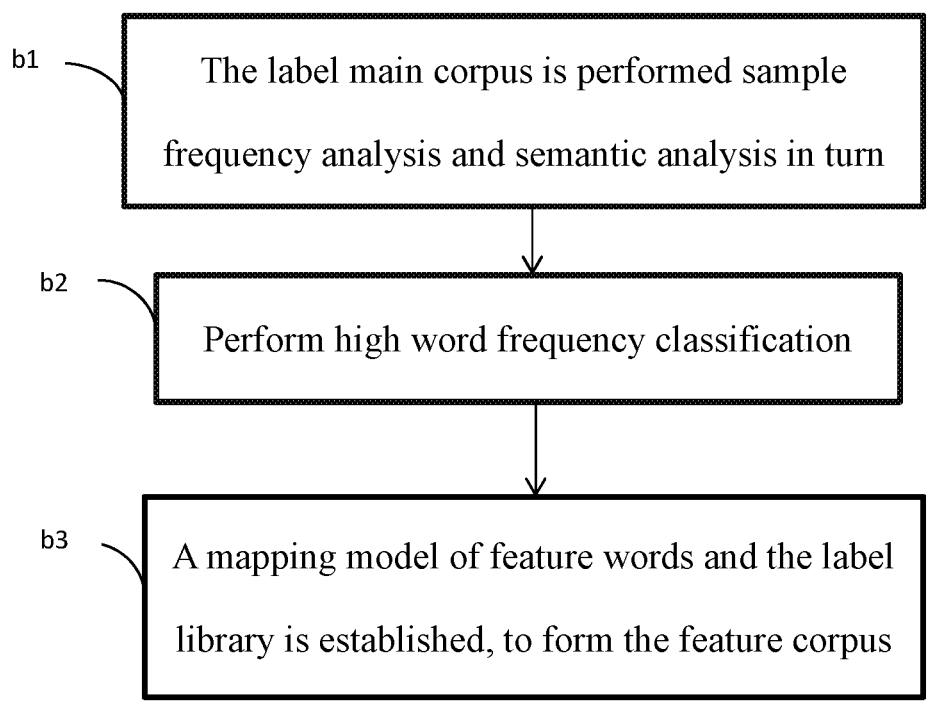
FIG. 3 is a flowchart of one exemplary embodiment of a step of establishing a feature corpus of the block 1 of FIG. 1.

Specifically, FIG. 3 illustrates that the method of establishing the feature corpus. The method of establishing the feature corpus can begin at block b1.

At block b1, the label main corpus is performed sample frequency analysis and semantic analysis in turn.

At block b2, perform high word frequency classification.

At block b3, a mapping model of feature words and the label library is established, to form the feature corpus.

In at least one exemplary embodiment, a label library comprises: {car: 'tyre', 'hood', 'motor', 'column A', 'cab', 'steering wheel', 'leaf plate', 'taillight', 'headlight', 'tail gas'}, and, {cosmetics: 'cosmetology', 'skin care', 'skin whitening', 'cosmetics', 'sunscreen', 'beatify', 'primp', 'replenishment', 'emollient'}; the feature words are shown as follows: {car: 'FAW-VOLKSWAGEN', 'Chevrolet', 'Beijing Hyundai'}, and {cosmetics: 'L'Oreal', 'Lancome', 'Dreamtimes', 'Clinique'}.

Figure 4:
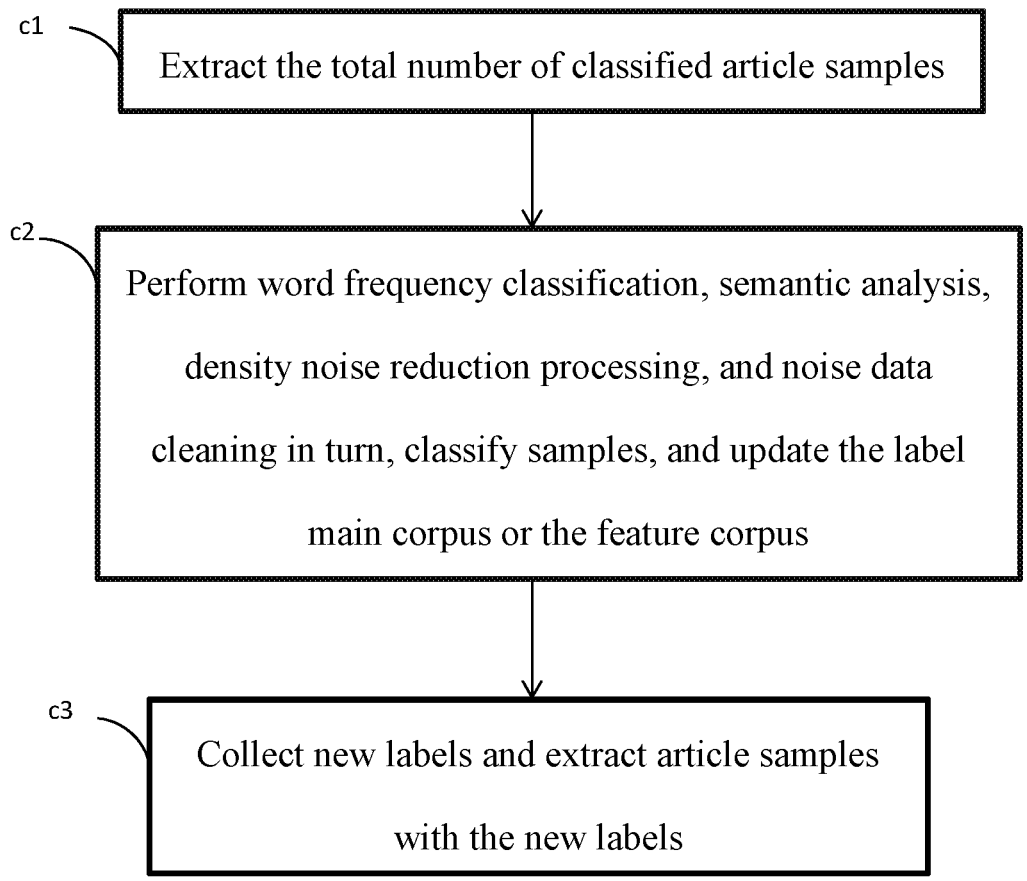
FIG. 4 is a flowchart of one exemplary embodiment of a step of updating and maintaining the label main corpus and the feature corpus respectively of the block 1 of FIG. 1.

To ensure the accuracy of the data, FIG. 4 illustrates that the method of updating and maintaining the label main corpus and the feature corpus after the step of establishing the label main corpus and the feature corpus. The method of updating and maintaining the label main corpus and the feature corpus can begin at block c1.

At block c1, extract the total number of classified article samples.

At block c2, perform word frequency classification, semantic analysis, density noise reduction processing, and noise data cleaning in turn, classify samples, and update the label main corpus or the feature corpus.

At block c3, collecting new labels and extract article samples with the new labels.

FIG. 1 illustrates the text mining-based attribute analysis method. At block 2, extract all history article samples of the Internet media users, and clean out videos, audios, and pictures of the history article samples.

At block 3, the article samples are performed dynamic clustering and fuzzy clustering, synchronously, and perform word frequency classification, semantic analysis, class feature analysis, class parameter amendment, and density noise reduction processing, sequentially, to generate an ordered classified text and calculate a first noise level A according to a third result of the ordered classified text.

At block 4, compare the first noise level A with the threshold a to determine whether the first noise level A is less than the threshold a. If yes, the method goes to block 5; if no, the method goes to block 3. Specifically, the threshold a is greater than 0 and less than 0.4.

At block 5, perform model clustering, semantic analysis, class feature analysis, and density noise reduction processing, sequentially, to generate a second ordered classified text and calculate a second noise level B according to a second result of the second ordered classified text.

At block 6, compare the second noise level B with the threshold a to determine whether the second noise level B is less than the threshold a. If yes, the method goes to block 5; if no, amend the class parameters, then the method goes to block 5. Specifically, the threshold a is greater than 0 and less than 0.4.

At block 7, perform model classification to form an attribute collection of the Internet media users.

Specifically, a value of the threshold a is a dynamic value and is a manually set value. The value of the threshold a is determined by the business needs, mining efficiency, analysis, and other factors. Preferably, the value of the threshold a is equal to 0.1

Because each of the noise level A, B, M, and N is compared with the threshold a continuously, to determine whether the generated ordered classified texts meet the requirements. Thus, in order to calculate the accuracy of the values, each of the first noise level A, the second noise level B, the third noise level M, and the fourth noise level is calculated by using the following unified algorithm.

Considering the given object set D, k-distance neighborhood of an object o being marked as disk k(o), is a distance dist(o, p) between the object o and another object p (p∈D), thus, there are at least K objects o', and o'∈D, thus, disk (o, o')≤dist(o, p);

there are at least K−1 objects o', and o'∈D, thus, disk (o, o')≤dist(o, p).

Thus: Nk(o)={o'|o'∈D, dist(o, o')≤distk(o)}.

There are two objects o and o', if dist(o, o')>distk(o), a reachable distance between the object o and the object o' is dist(o, o'); if dist(o, o')≤distk(o), the reachable distance between the object o and the object o' is distk(o). Thus, reach dist k(o←o')=max{distk(o), dist(o, o')}, a local reachable density of the object o is shown as follows:

$$lrdk(o) = \frac{\|Nk(o)\|}{\sum o' \in Nk(o)^{reachdistk(o \leftarrow o')}}.$$

Thus, the local outlier factor of the object o is defined as follows:

$$LOFk(o) = \frac{\sum o' \in Nk(o) \frac{lrdk(o)}{lrdk(o')}}{\|Nk(o)\|}.$$

If the LOF k(o) is much less than 1, the object o is the outlier factor, and LOF k(o) is equal to a value of the third noise level M. Specifically, each of the first noise level A, the second noise level B, the third noise level M, and the fourth noise level N is a standard to determine whether the article samples meet business requirements, but is not directly related to processing the texts.

Specifically, the technical terms involved in the above method are explained as follows.

The label library is a library which is formed by a type of customized labels. Each label points to the thing which has same attributes. There are obvious feature difference between different types of labels, which follows the principle of high clustering and low coupling.

The cluster parameter means a group number which is set artificially according to the number of label types of the label library and the similarity of the articles, when using the clustering algorithm; the samples of the same group have higher similarity and the samples of the different groups have lower similarity; the parameter is used as the basis of clustering; and the parameter is adjusted continuously by the way of manual supervision, to achieve the best match with the label library.

The semantic analysis comprises artificial analysis and machine analysis. The artificial analysis is a process of determining the similarity between the samples by the way of artificial sampling and making a manual understanding of the samples, after clustering the samples, and is used as the basis for the amendment of cluster parameter. The machine analysis is a process of classifying the samples through the matching algorithm with the corpus when the samples are classified, and is used as the basis for the correction of the corpus.

The cluster feature analysis is a process of feature extraction and identification of the clustered clusters, which is made by the semantic analysis and by using the algorithm of extracting the main features.

The cluster parameter amendment means that during the process of building the corpus, adjust the group number of the clustering to be the best match with the label library by the way of manual supervision study and by using the cluster feature analysis, after a first time to cluster the samples. This process of adjusting the group number is the cluster parameter amendment.

The density noise reduction processing means that during the process of the cluster feature analysis, the data needs to be performed noise processing. The far points are removed from the main feature scatter distribution map to form a category collection which responses to the main feature. The process of removing the noise points is the density noise reduction processing.

The class feature analysis is a process of feature extraction and identification of the noise-reduced category collection by a first time of reducing noise.

The class parameter amendment means that during the process of building the corpus, adjust the group number of the clustering to be the best match with the label library by the way of manual supervision study and by using the class feature analysis, after a second time to cluster the samples. This process of adjusting the group number is the class parameter amendment.

The label library amendment means that during a second time of clustering, as a-noise reduction has been done, the sample classification has met initially a principle of high clustering and low coupling. After the second time noise reduction is performed based on the model, business requirements are met. At this moment, the classification model has been confirmed; and then the label library is adjusted to achieve the best match with the classification, and this adjusting process is the label library amendment.

The classification based on model means that: a classification model based on the samples is formed after two times of noise reduction processes, as a correction algorithm of cold starting; and then classify the samples, which need to be classified, based on model. This process is the classification based on model.

The dynamic clustering refers to finding the sample vocabulary matching the relevant category according to limited categories.

The fuzzy clustering refers to performing fuzzy attribution category according to the sample vocabulary semantic.

The model clustering means that: firstly, assume a category; secondly, find the sample vocabulary matching the relevant category, and the given category and sample vocabulary are the best fit.

The exemplary embodiments shown and described above are only examples. Many details are often found in the art such as the other features of a text mining-based attribute analysis method for Internet media users. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A text mining-based attribute analysis method for Internet media users comprising:
   block 1, establishing a label main corpus and a feature corpus sequentially, and updating and maintaining the label main corpus and the feature corpus respectively;
   block 2, extracting all history article samples of the Internet media users, and cleaning out videos, audios and pictures of the history article samples;
   block 3, performing on the extracted history article samples dynamic clustering and fuzzy clustering synchronously, and performing word frequency classification, semantic analysis, class feature analysis, class parameter amendment, and density noise reduction processing, sequentially, to generate an ordered classified text and calculate a first noise level A according to a first result of the ordered classified text;
   block 4, comparing the first noise level A with a threshold a to determine whether the first noise level A is less than the threshold a; if yes, the method goes to block 5; if no, the method goes to block 3;
   block 5, when the first noise level A is less than the threshold a, performing model clustering, semantic analysis, class feature analysis, and density noise reduction processing, sequentially, to generate a second ordered classified text and calculate a second noise level B according to a second result of the second ordered classified text;
   block 6, comparing the second noise level B with the threshold a to determine whether the second noise level B is less than the threshold a; if yes, the method goes to block 5; if no, amend the class parameters, then the method goes to block 5; and
   block 7, performing model classification to form an attribute collection of the Internet media users;
   wherein the threshold a is greater than 0 and less than 0.4.

2. The method of claim 1, wherein the step of establishing the label main corpus comprising:
   block a1, extracting article samples, cleaning the article samples, and cleaning out audio, video, pictures, incomplete articles, garbled, and illegal characters;
   block a2, classifying artificially according to a label library;
   block a3, the article samples being clustered dynamically and clustered fuzzily at the same time, and setting the cluster parameters;
   block a4, performing semantic analysis, cluster feature analysis, cluster parameter amendment, and density noise reduction processing, sequentially, to generate a first main corpus ordered classified text and calculating a third noise level M according to a third result of the first main corpus ordered classified text;
   block a5, comparing the third noise level M with a threshold a to determine whether the third noise level M is less than the threshold a; if yes, the method goes to block a6; if no, the method goes to block a3;
   block a6, performing model clustering, semantic analysis, class feature analysis, class parameter amendment, and density noise reduction processing, sequentially, to generate a second main corpus ordered classified text and calculating a fourth noise level N according to a fourth result of the second main corpus ordered classified text;
   block a7, comparing the fourth noise level N with the threshold a to determine whether the fourth noise level N is less than the threshold a; if yes, the method goes to block a8; if no, amend the label library, then the method goes to block a6; and
   block a8, performing model classification to form the label main corpus.

3. The method of claim 2, wherein the step of establishing the feature corpus comprising:
   block b1, the label main corpus being performed sample frequency analysis and semantic analysis in turn;
   block b2, performing high word frequency classification; and
   block b3, applying a mapping model of feature words and the label library to form the feature corpus.

4. The method of claim 2, wherein the step of updating and maintaining the label main corpus and the feature corpus respectively comprising:

block c1, extracting the total number of classified article samples;

block c2, performing word frequency classification, semantic analysis, density noise reduction processing, and noise data cleaning in turn, classifying samples, and updating the label main corpus or the feature corpus; and block c3, collecting new labels and extracting article samples with new labels.

5. The method of claim 4, wherein each of the noise level A, B, M, and N is calculated using the following unified algorithm:

considering the given object set D, k-distance neighborhood of an object o being marked as disk k(o), is a distance dist(o, p) between the object o and another object p (p∈D), thus, there are at least K objects o', and o'∈D, thus, disk (o, o')≤dist(o, p);

there are at least K−1 objects o', and o'∈D, thus, disk (o, o')≤dist(o, p);

thus: Nk(o)={o'|o'∈D, dist(o, o')≤distk(o)};

there are two objects o and o', if dist(o, o')>distk(o), a reachable distance between the object o and the object o' is dist(o, o'); if dist(o, o')≤distk(o), the reachable distance between the object o and the object o' is distk(o);

thus, reachdist k(o←o')=max{distk(o), dist(o, o')};

a local reachable density of the objects o is shown as follows:

$$lrdk(o) = \frac{\|Nk(o)\|}{\sum o' \in Nk(o)^{reachdistk(o \leftarrow o')}};$$

thus, the local outlier factor of the objects o is defined as follows:

$$LOFk(o) = \frac{\sum o' \in Nk(o) \frac{lrdk(o)}{lrdk(o')}}{\|Nk(o)\|}.$$

6. The method of claim 1, wherein the step of establishing the feature corpus comprising:

block b1, the label main corpus being performed sample frequency analysis and semantic analysis in turn;

block b2, performing high word frequency classification; and block b3, a mapping model of feature words and the label library being established, to form the feature corpus.

7. The method of claim 1, wherein the step of updating and maintaining the label main corpus and the feature corpus respectively comprising:

block c1, extracting the total number of classified article samples;

block c2, performing word frequency classification, semantic analysis, density noise reduction processing, and noise data cleaning in turn, classifying samples, and updating the label main corpus or the feature corpus; and block c3, collecting new labels and extracting article samples with new labels.

8. The method of claim 7, wherein each of the noise level A, B, M, and N is calculated using the following unified algorithm:

considering the given object set D, k-distance neighborhood of an object o being marked as disk k(o), is a distance dist(o, p) between the object o and another object p (p D), thus, there are at least K objects o', and o'∈D, thus, disk (o, o')≤dist(o, p);

there are at least K−1 objects o', and o'∈D, thus, disk (o, o')≤dist(o, p);

thus: Nk(o)={o'|o'∈D, dist(o, o')≤distk(o)};

there are two objects o and o', if dist(o, o')>distk(o), a reachable distance between the object o and the object o' is dist(o, o'); if dist(o, o')≤distk(o), the reachable distance between the object o and the object o' is distk(o);

thus, reachdist k(o←o')=max{distk(o), dist(o, o')};

a local reachable density of the objects o is shown as follows:

$$lrdk(o) = \frac{\|Nk(o)\|}{\sum o' \in Nk(o)^{reachdistk(o \leftarrow o')}};$$

thus, the local outlier factor of the objects o is defined as follows:

$$LOFk(o) = \frac{\sum o' \in Nk(o) \frac{lrdk(o)}{lrdk(o')}}{\|Nk(o)\|}.$$

* * * * *